3,712,887
PROCESS FOR PREPARING ε-CAPROLACTAM
Yves Colleuille and Roger J. Gardon, Lyon, France, assignors to Rhone-Poulenc S.A., Paris, France
No Drawing. Filed Oct. 2, 1970, Ser. No. 77,751
Claims priority, application France, Oct. 3, 1969, 6933860
Int. Cl. C07d 41/06
U.S. Cl. 260—239.3 A      8 Claims

ABSTRACT OF THE DISCLOSURE

ε-Caprolactam is prepared from a cyclohexane oxidation product containing cyclohexyl hydroperoxide and oxidation by-products including 6-hydroperoxy-hexanoic acid, which has been obtained by liquid phase oxidation of cyclohexane, without a metal catalyst, using a molecular oxygen containing gas, by washing the oxidation product with water, separating the resulting aqueous phase containing 6-hydroperoxyhexanoic acid and heating the acid under pressure with ammonia and hydrogen in the presence of a hydrogenation catalyst.

---

The present invention relates to a process for preparing ε-caprolactam from by-products present in the cyclohexyl hydroperoxide solutions obtained by oxidation of cyclohexane in the liquid phase, without a metal catalyst, using a molecular oxygen containing gas.

It is well known to oxidise cyclohexane with gas mixtures containing molecular oxygen, to give solutions in which the nature and proportion of the oxidation products vary considerably, depending on the conditions under which the oxidation is carried out.

Thus, during the oxidation of cyclohexane with air in the liquid phase and in the presence of metal catalysts such as cobalt derivatives, cyclohexanol and cyclohexanone are principally obtained. It is known to remove at least a part of the by-products formed during the oxidation, before distilling the final products, by washing with water or alkaline solutions either at the end of the oxidation or during or between the various stages of the oxidation. As well as dicarboxylic acids such as succinic, glutaric and adipic acid, these aqueous wash solutions essentially contain ε-hydroxycaproic acid and polymers derived therefrom, which can be converted into ε-hydroxycapronitrile and 6-cyano hexene by reaction with ammonia in the presence of dehydration catalysts, see French patent specification No. 1,428,966.

It is furthermore known that it is possible to obtain cyclohexane oxidation products in which the proportion of cyclohexyl hydroperoxide in the oxidised products is relatively high, if certain conditions for carrying out the process are observed. Thus, it has been proposed to carry out the oxidation without a catalyst, to allow the reagents a very short residence time in the oxidiser, and to carry out the process at relatively low temperatures, with low degrees of conversion and in an apparatus which does not catalyse the decomposition of the hydroperoxides. It has also been proposed to carry out the process in the presence of sequestering agents for metals or to treat the cyclohexane which is recycled to the oxidation zone by means of a basic reagent.

Notwithstanding these various measures, which undoubtedly contribute to increasing the yield of cyclohexyl hydroperoxide in the oxidation products, an amount of by-products, which is still considerable, nevertheless forms during the oxidation. Of these by-products, only cyclohexanol, cyclohexanone and adipic acid have hitherto aroused interest, because they constitute fundamental starting materials for the chemical industry. In view of the increasing importance of the preparation of cyclohexyl hydroperoxide by oxidation of cyclohexane, the utilisation of the by-products which the resulting oxidation products contain, other than the by-products mentioned above, becomes important.

The present invention is concerned with utilising such oxidation by-products to produce ε-caprolactam, useful in the production of polyamides. Furthermore, the cyclohexane oxidation products treated in accordance with this invention contain less oxidation by-products and are more suitable for certain applications.

Accordingly, the present invention provides a process for preparing ε-caprolactam from a cyclohexane oxidation product containing cyclohexyl hydroperoxide and oxidation by-products including 6-hydroperoxy-hexanoic acid which has been obtained by liquid phase oxidation of cyclohexane, without a metal catalyst, using a molecular oxygen containing gas wherein the oxidation product is washed with water and the resulting aqueous phase containing 6-hydroperoxy hexanoic acid separated and the 6-hydroperoxy-hexanoic acid heated under pressure with ammonia and hydrogen in the presence of a hydrogenation catalyst.

Any cyclohexane oxidation product containing cyclohexyl hydroperoxide and prepared without a metal catalyst can be treated in accordance with the present process, but the benefit derived from this treatment is the greater the higher the content of hydroperoxides in the oxidised products. The process is particularly useful for treating cyclohexane solutions of cyclohexyl hydroperoxide in which the oxidised products which are less volatile than cyclohexane contain at least 50% by weight of peroxidic products. Such solutions can be prepared in accordance with the process described in French patent specification No. 1,505,363 and also according to the first stage of the process described in United States patent specification No. 2,931,834. These solutions can be concentrated before washing by applying any known technique.

The washing with water is effected preferably in the liquid phase at temperatures of between 5° and 100° C., optionally under autogenic pressure or under pressure of an inert gas such as nitrogen, if the temperature used is above the boiling point of the water-cyclohexane azeotrope. The weight of water used generally represents from 0.01 to 1 times, preferably from 0.05 to 0.5 times, the weight of solution to be washed. Any of the conventional techniques of washing in the liquid phase can be used, and the process can be carried out continuously or discontinuously.

Before subjecting the aqueous phase to the reaction with ammonia and hydrogen in the presence of the hydrogenation catalyst, the 6-hydroperoxy hexanoic acid can be purified. This purification can, for example, consist of extracting the aqueous wash solutions with a water-immiscible alcohol, ester or ketone. The alcohols which can be used include alkanols having 4 to 10 carbon atoms, cycloalkanols having 5 to 8 carbon atoms in the ring and optionally substituted by one or more alkyl groups having 1 to 4 carbon atoms, and phenylalkanols having 7 to 10 carbon atoms. Ketones which can be used include dialkylketones having 4 to 12 carbon atoms, cycloalkanones having 5 to 8 carbon atoms in the ring, optionally substituted by alkyl groups with 1 to 4 carbon atoms, phenyl alkyl ketones and cycloalkyl alkyl ketones having 8 to 10 carbon atoms. Esters which can be used include those derived from alkylcarboxylic acids having 2 to 8 carbon atoms and alkanols having 1 to 4 carbon atoms.

Specific organic solvents which may be used for this extraction are ethyl acetate, amyl acetate, butyl propionate, methyl 2-ethylhexanoate, the amyl alcohols, 2-ethyl hexanol, 3-methyl-2-pentanol, the methylcyclohexanols, methyl ethyl ketone, methyl isobutyl ketone, cyclohexanone, acetophenone, and methyl propyl ketone. The extraction may be carried out at between 10° and 30° C. and the weight of organic solvent used may be 0.5 to 5 times the weight of aqueous solution to be extracted. This purification can be completed by removing the organic solvent, preferably under reduced pressure and at a temperature below 50° C.

The 6-hydroperoxy-hexanoic acid is preferably used in aqueous solution and the aqueous wash solution obtained in the first stage of the process may be reacted with ammonia and hydrogen. Before subjecting the solution to reaction with ammonia and hydrogen, the small quantities of cyclohexyl hydroperoxide, cyclohexanol and cyclohexanone present in these aqueous solutions can be extracted from them with a liquid hydrocarbon such as cyclohexane. The solutions can also be concentrated beforehand, preferably under reduced pressure and at a temperature not exceeding 50° C., and the dicarboxylic acids which precipitate, where appropriate after cooling, can then be separated off. In practice, as the diacids present in the aqueous wash solutions do not interfere with the conversion of the 6-hydroperoxy-hexanoic acid to $\epsilon$-caprolactam, the reaction can advantageously be carried out without separating off the diacids beforehand.

The hydrogenation catalysts which can be used include nickel, platinum, palladium, ruthenium and rhodium. They can be deposited on carriers such as silicas, aluminas, charcoals or aluminosilicates. Platinum and palladium deposited on charcoal are particularly advantageous to use.

A molar excess of ammonia relative to 6-hydroperoxy-hexanoic acid is generally employed, the quantity employed generally varying between 5 and 25 mols of ammonia per mol of 6-hydroperoxy-hexanoic acid.

In practice, the second stage of the process of the invention can be carried out by introducing the 6-hydroperoxy-hexanoic acid, optionally in aqueous solution, the catalyst and the ammonia into an autoclave and then introducing hydrogen under a pressure which can vary depending on the catalyst used, but is generally between 10 and 200 bars and most frequently between 30 and 120 bars. Thereafter the autoclave is heated to a temperature of between 200 and 300° C., preferably between 230° and 280° C.

The $\epsilon$-caprolactam can be separated from the remaining mixture in known manner, for example by extraction. If the operation has been carried out in an aqueous medium, water-immiscible solvents such as chloroform are used. The $\epsilon$-caprolactam can thereafter be isolated from its solutions by distillation.

The examples which follow illustrate the invention. Temperatures are in ° C.

EXAMPLE 1

(a) A cyclohexane solution of hydroperoxides, obtained by oxidation of cyclohexane in the liquid phase without a catalyst by means of air of reduced oxygen content, and preconcentration, is continuously introduced, at the rate of 20 kg./hour, at the bottom of a plate column having an external jacket in which a fluid maintained at 95° is circulated. Water is simultaneously introduced in counter-current at the rate of 1 kg.hour. The troduced in counter-current at the rate of 1 kg./hour. The pressure in the column is maintained at 3 bars relative pressure. The pressure on the aqueous wash phase is released and the phase separated off at the bottom of the column. This aqueous phase is concentrated by heating to 35° under 20 mm. mercury pressure to give a concentrated aqueous solution containing 10.5% by weight of 6-hydroperoxyhexanoic acid.

(b) 350 g. of this aqueous solution, 7 g. of platinum on charcoal (containing 5% of metal) and 119 g. of ammonia are introduced into a 1 litre autoclave which is vibrated. The autoclave is closed and hydrogen then introduced under a pressure of 60 bars. The autoclave is then gradually heated to 275° and kept at this temperature for 2 hours. The maximum pressure observed at this temperature is 280 bars. After cooling and degassing the catalyst is filtered off and the aqueous phase is extracted six times with 350 cm.$^3$ of chloroform. The solvent is removed an the residue is then distilled, yielding 12.6 g. of $\epsilon$-caprolactam.

This autoclave experiment is repeated twice more using, as the aqueous starting solution in each succeeding experiment, the aqueous phase obtained at the end of the preceding experiment, after extraction with chloroform.

In this way, a further 5 g. and then 2.6 g. of $\epsilon$-caprolactam are obtained.

The cyclohexane solution of hydroperoxides used in step (a) was obtained as described in French patent specification No. 1,491,518, the degree of conversion at the outlet from the last oxidiser being 4%. It contains 15.3% by weight of oxidation products and 10.4% by weight of hydroperoxide.

EXAMPLE 2

The experiments described in Example 1(b) are repeated in a 125 cm.$^3$ autoclave, starting with 50 g. of initial aqueous solution, replacing the platinum by 1 g. of palladium on charcoal (containing 10% of metal) and using 17 g. of ammonia.

3 g. of $\epsilon$-caprolactam are finally obtained.

We claim:

1. A process for preparing $\epsilon$-caprolactam from a cyclohexane oxidation product containing cyclohexyl hydroperoxide and oxidation by-products including 6-hydroperoxy-hexanoic acid which has been obtained by liquid phase oxidation of cyclohexane without a metal catalyst using a molecular oxygen containing gas, wherein the oxidation product is washed with water and the resulting aqueous phase containing 6-hydroperoxy-hexanoic acid separated and the 6-hydroperoxy-hexanoic acid heated at a temperature of between 200 and 300° C. under pressure with ammonia and hydrogen in the presence of a hydrogenation catalyst which consists essentially of a member selected from the group consisting of nickel, platinum, palladium, ruthenium or rhodium.

2. A process according to claim 1 wherein the aqueous phase containing the 6-hydroperoxy-hexanoic acid is heated with ammonia and hydrogen.

3. A process according to claim 2 wherein the aqueous phase is extracted with a liquid hydrocarbon before being heated with ammonia and hydrogen.

4. A process according to claim 1 wherein the aqueous phase is extracted with a water-immiscible solvent comprising an alcohol, ester or ketone and the extracted 6-hydroperoxy-hexanoic acid heated with ammonia and hydrogen.

5. A process according to claim 1 wherein the oxidation product is a cyclohexane solution of cyclohexyl hydroperoxide in which the oxidised products which are less volatile than cyclohexane contain at least 50% by weight of peroxidic products.

6. A process according to claim 1 wherein the oxidation product is washed with 0.01 to 1.0 times its weight of water at 5–100° C.

7. A process according to claim 1 wherein the aqueous phase is heated at 200–300° C. under a pressure of 10–200 bars in the presence of hydrogen and 5–25 mols of ammonia per mole of 6-hydroperoxy-hexanoic acid in the presence of a supported platinum or palladium catalyst.

8. A process according to claim 5 wherein the oxidation product contains about 15% by weight oxidation products and about 10% by weight cyclohexyl hydroperoxide, the oxidation product is washed continuously with water in counter-current at about 95° C., at about 3 bars pressure using a weight ratio of oxidation product to water of about 20:1, the resulting aqueous solution concentrated under reduced pressure to give an aqueous solution containing about 10% by weight 6-hydroperoxy-hexanoic acid and the concentrated aqueous solution heated at about 275° C., under pressure rising to about 280 bars in the presence of hydrogen, ammonia and a platinised or palladised charcoal catalyst.

References Cited

UNITED STATES PATENTS

| | | | |
|---|---|---|---|
| 2,817,646 | 12/1957 | Payne | 260—239.3 A |
| 3,317,516 | 5/1967 | Mifune et al. | 260—239.3 A |
| 3,317,517 | 5/1967 | Mifune et al. | 260—239.3 A |

FOREIGN PATENTS

| | | | |
|---|---|---|---|
| 1,204,650 | 11/1965 | Germany | 260—239.3 A |
| 1,233,843 | 2/1965 | Germany | 260—239.3 A |

JOHN D. RANDOLPH, Primary Examiner

R. T. BOND, Assistant Examiner

U.S. Cl. X.R.

260—535 R, 610 R